Figure 1:
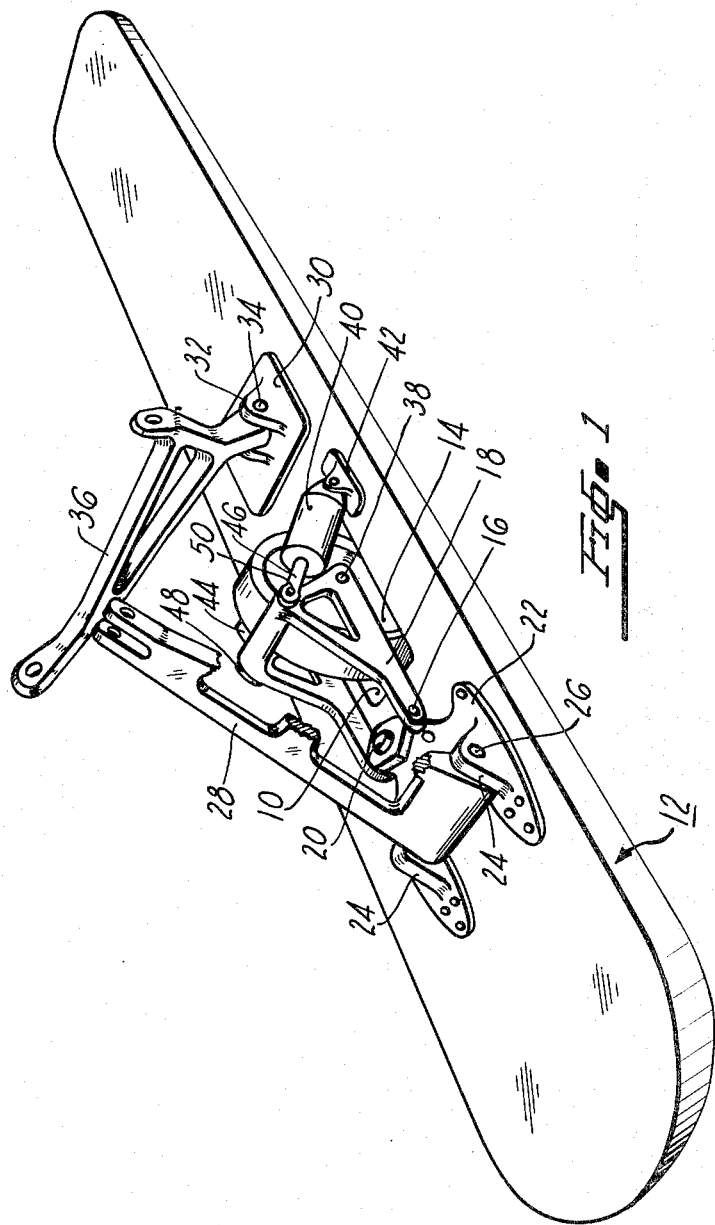

Nov. 16, 1965   F. C. ALBRIGHT   3,218,006
STEERABLE SKID MEANS
Filed Aug. 14, 1963   2 Sheets-Sheet 1

INVENTOR.
FRANKLIN C. ALBRIGHT
BY
Richard L. Geib

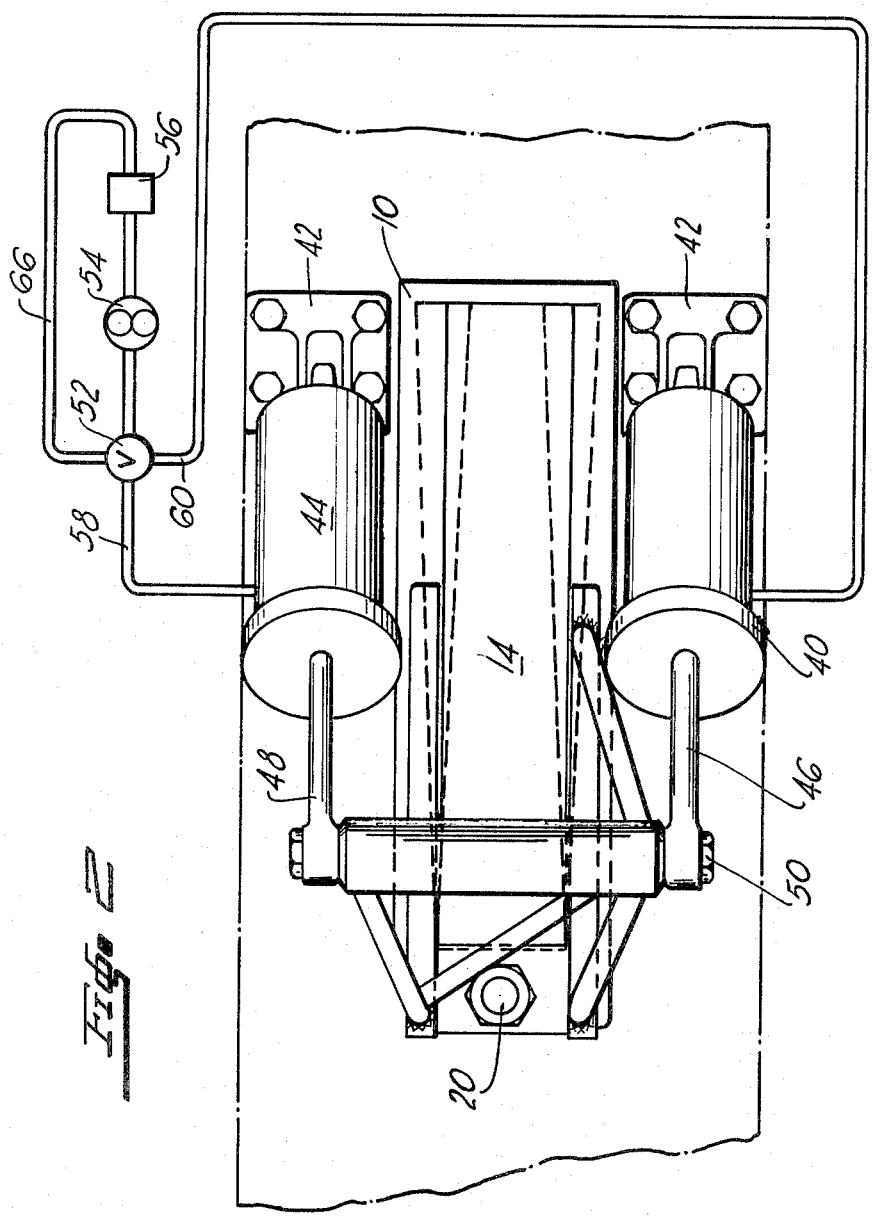

3,218,006
STEERABLE SKID MEANS
Franklin C. Albright, South Bend, Ind., assignor to The Bendix Corporation, South Bend, Ind., a corporation of Delaware
Filed Aug. 14, 1963, Ser. No. 302,045
8 Claims. (Cl. 244—50)

This invention relates to a steering device for a skidding vehicle.

Due to misalignment of a vehicle with a ground surface such as the misalignment of a flight path due to cross winds or crown in a roadway, an operator of the vehicle will definitely need a means of steering. With all skids having an equal maximum value of friction coefficient, it is necessary to have a means of stabilizing the vehicle against rotation. Incorporation of a steering device, as described hereinafter will serve as a fundamental contribution toward the solution of these problems.

It is, therefore, an object of this invention to provide a steering mechanism for a skidding vehicle which will be effective on any ground surface, e.g., asphalt, concrete, dry lake bed or soil.

It is also the principal intent of my invention to provide a small wheel capable of creating a side force sufficiently large to alter the direction of the vehicle.

A still further object of my invention is to provide a wheel that rotates with a sliding motion on the ground surface to provide a high coefficient of friction, which sliding motion of the rotating wheel will create a side force sufficiently large to alter the direction of the vehicle.

Still another object of my invention is the provision of a simple actuation means to force the wheel to contact the ground surface at an angle to the direction of skidding.

A still further object of my invention is to provide an actuating means which not only applies a vertical load to the wheel but also imparts a slight angle to the wheel with respect to the longitudinal centerline of the vehicle to bring about the aforementioned side force.

It is also an object of my invention to create a steerable control to stabilize the associated vehicle from rotation and reduced the sliding distance when the vehicle is provided with skids having an equal friction coefficient.

The foregoing objects and advantages as well as others will be readily apparent to those skilled in the art to which my invention relates from the following description of the accompanying drawings in which:

FIGURE 1 is an isometric view of a vehicle skid employing the steerable mechanism in accordance with my invention; and FIGURE 2 is a plan view of the steerable control for a wheel mounted along the actual centerline of the skid of FIGURE 1 and also showing a schematic control arrangement for the actuating means for the wheel.

In more detail and with particular reference to FIGURE 1, a slot 10 is provided in a skid structure 12, and a wheel 14, whose diameter and width is slightly less than the slot 10 which wheel is universally mounted to the skid 12, as by a universal joint 16 and bracket 18. The universal joint 16 is mounted to a vertical shaft 20. Thus, it may be said that the bracket 18 may be capable of up and down motion as well as pivotal motion about shaft 20. The shaft 20 is affixed to the skid by a bracket 22 which is provided with upwardly extending ears 24 drilled to receive a shaft 26 that mounts an upwardly extending brace mechanism 28 that may be joined with vehicle structure (not shown) at the upward extremities thereof.

In addition, the skid is provided with a flat plate 30 having ears 32 similar to those extending upwardly from the bracket 26. The ears 32 mount, by means of a pin 34, an angled bracing mechanism 36 that is also capable of attachment with a vehicle (not shown).

The bracket 18 is drilled as at 38 to receive an axle (not shown) of the wheel 14 such that the wheel may rotate within the bracket structure. An actuator 40 is mounted by a plate 42 to the skid 12 for pivotal movement at one end thereof. A similar actuator 44 is also similarly mounted to the skid 12 such that they are coextensive to either side of the wheel 14 and have push rods 46 and 48 connected to opposite sides of the bracket 18, as by the pin 50.

Thus the wheel support bracket is attached to the skid structure by the universal joint 16 and the two cylinder support fittings or plates 42. The vertical axis of universal joint 16 permits the wheel to be moved to one side or the other, creating a yawed angle with the centerline of the skid; whereas the other axes of the universal is parallel to the ground and permits the wheel axle to rotate in a vertical direction with respect to the ground contact point. Therefore a force applied by either of the cylinders 40 or 42 will result in forcing the wheel 14 downward and to one side.

As may be readily appreciated by any practitioner in the field to which my invention relates, the wheel 14 may be made of various compositions and may be constructed in any number of ways. For example, a wheel surface may consist of tungsten carbide grains attached to a rim by copper brazing and them flame-sprayed with a copper nickel alloy to give an excellent friction surface, or it may be a wire brush type wheel, a solid copper rim, or a wheel may be designed which incorporates flexibility or resiliency in the wheel rim in that the rim is made up of many springs each having a sandwiched-tipped friction element. In the latter embodiment the correct angle of the spring and the spring rate will be carefully determined to obtain the resiliency desired and yet retain the high friction coefficient required.

A schematic control system is shown in FIGURE 2, in order to complete the description of the operation of my device as follows:

A control valve 52 is provided to energize or deenergize a fluid pressure system including a pump 54 and a reservoir 56. Conduits 58 and 60 lead from the valve 52 to an upper chamber of cylinder 44 and an upper chamber of cylinder 40, respectively. Thus, as the valve 52 is rotated to communicate the conduit 60 with the pump 54, the cylinder 40 will lower the wheel 14 through the slot 10 while rotating the wheel counterclockwise about the shaft 20. Opposite rotation of the wheel about shaft 20 will occur upon rotation or movement of valve 52 to communicate conduit 58 with pump 54. As is seen also in FIGURE 2, a conduit 66 is provided to communicate the reservoir 56 with the pump 54 during a deenergized condition.

By way of exemplifying a need for a mechanism in accordance with my invention, I suggest that it would be readily used by an aircraft whose only contact with the ground is by a sliding surface having little or no directional control once ground contact is made. With a 6,000 foot runway and 300 foot wide the maximum angle the pilot of such an aircraft could be misaligned therewith in the air is 2°50′, but if we assume he lands on the center line of a runway, then his error in angle on the ground could not be greater than 1°25′. Crosswinds plus the fact that many runways are narrower than 300 feet, will make it necessary for the pilot to control the misalignment more accurately. Some type of steering is a desirable feature on any slide-out type of landing. As I have described, wheels are provided, one on each vehicle skid, assuming there are three skids for a main and nose type landing gear, and these wheels are capable of making a yaw angle of contact with the ground. The amount of yaw in the wheel will be a function of the vertical load, i.e., a single cylinder will exert a vertical and side force on the wheel structure at the same time, and the ratio is determined by the geometry of the structure. The amount of side load obtainable will depend on the friction coefficient of the wheel rim with the ground surface. The resultant of the side forces, nose and main skids, should pass through the center of gravity of the vehicle for all practical purposes. Any small error in this resultant will cause the vehicle to rotate, however, this should be of such a low rate that as soon as the steering effort is stopped the vehicle will right itself due to the inherent sliding stability such as would be present in a vehicle having a lower friction coefficient in a forward skid. The application of load to the steering wheel will be intermittent. The vertical load on the wheel (twenty-five percent of vertical reaction or less) will be a minimum value, only sufficient for steering, because the drag force on this rotating wheel will be much less for the wheel skid material and the slide-out distance will be increased. By intermittent action and by conservative steering action this increase slide-out distance will not be serious, as I have calculated one to be limited to at least a five to ten percent increase only.

Another feature of this steering device is that it can be used to stabilize the vehicle during slide-out operation as aforementioned. If the friction coefficient of all the skids is the same, then the pilot could, by operating either nose or main skid steering, stabilize the vehicle from rotation. This feature has some advantages in that the friction characteristics can be the same on all skids thereby reducing the slide-out distance.

It should be understood that in as much as this invention is adaptable to certain modifications and changes, the applicant does not wish to be limited to this specific form and arrangements shown and described, but intends only to be limited within the scope of the hereinto appended claims, i.e., the wheel need not be incorporated as a part of the vehicle skid, but can be supported from any part of the aircraft structure. Convenience would usually dictate installation on the skid.

I claim:
1. For use with a nonrotatable vehicle skid, a steering mechanism comprising:
   a bracket;
   a universal type fitting joining said bracket to the vehicle skid, said universal connection being adapted to permit said bracket to freely pivot about a horizontal and a vertical axis of the universal fitting;
   an actuator pivotally connected at one end to the vehicle skid and operatively connected at the other end thereof to the bracket, said actuator being adapted to control the motion of said bracket about said universal fitting; and
   a wheel rotatably mounted by said bracket to normally overlie a slot of larger dimension than the diameter and width of said wheel within the vehicle skid, said wheel being projected through said slot upon operation of said actuator at an angle to the vehicle skid to create a force vector tending to change the direction of the skid in its travel over an underlying ground surface.

2. For use with a vehicle skid, a steering mechanism in accordance with claim 1 and further comprising:
   a second actuator pivotally connected to said vehicle skid and operatively connected to said bracket and adapted to cooperate with said actuator to provide multiple force vectors controlling the vehicle skid travel direction.

3. For use with a vehicle skid, a steering mechanism according to claim 1 wherein said wheel is arranged to normally be coincident before projection through said slot with the longitudinal axis of the vehicle skid.

4. For use with a vehicle skid, a steering mechanism in accordance with claim 1 wherein said universal connection includes a first rotational axis substantially coincident with a transverse axis of the vehicle skid, and a second rotational axis substantially normal to said first rotational axis.

5. For use with a vehicle skid, a steering mechanism in accordance with claim 1 wherein said actuator is arranged so as to apply both a vertical and a side load to said bracket to impart an angle to the wheel with respect to a longitudinal center-line of the vehicle skid.

6. For use with an aircraft having a tricycle type landing gear including nonrotatable skid surfaces, a steering mechanism comprising:
   a wheel operatively connected to the nonrotatable skid surfaces and arranged to pivot about a vertical and a horizontal axis;
   an actuating means arranged to pivot said wheel about said axes to contact an underlying surface at an angle with the direction of travel having a resultant force controlling a direction of travel of said aircraft; and
   a control means for operating said actuating means.

7. A steering mechanism according to claim 6 wherein said skid surfaces are characterized as having equal friction coefficients.

8. A steering mechanism according to claim 6 wherein said skid surfaces are arranged to have a forward skid of lesser friction coefficient than a pair of rear skids whereupon the aircraft has inherent sliding stability.

References Cited by the Examiner

UNITED STATES PATENTS

| | | | |
|---|---|---|---|
| 2,532,611 | 12/1950 | Ditter | 244—108 |
| 2,646,235 | 7/1953 | Dawson | 244—108 X |
| 3,020,009 | 2/1962 | Guilbert | 280—9 X |

FOREIGN PATENTS

| | | |
|---|---|---|
| 121,187 | 3/1946 | Australia. |

FERGUS S. MIDDLETON, *Primary Examiner.*